Patented Dec. 7, 1937

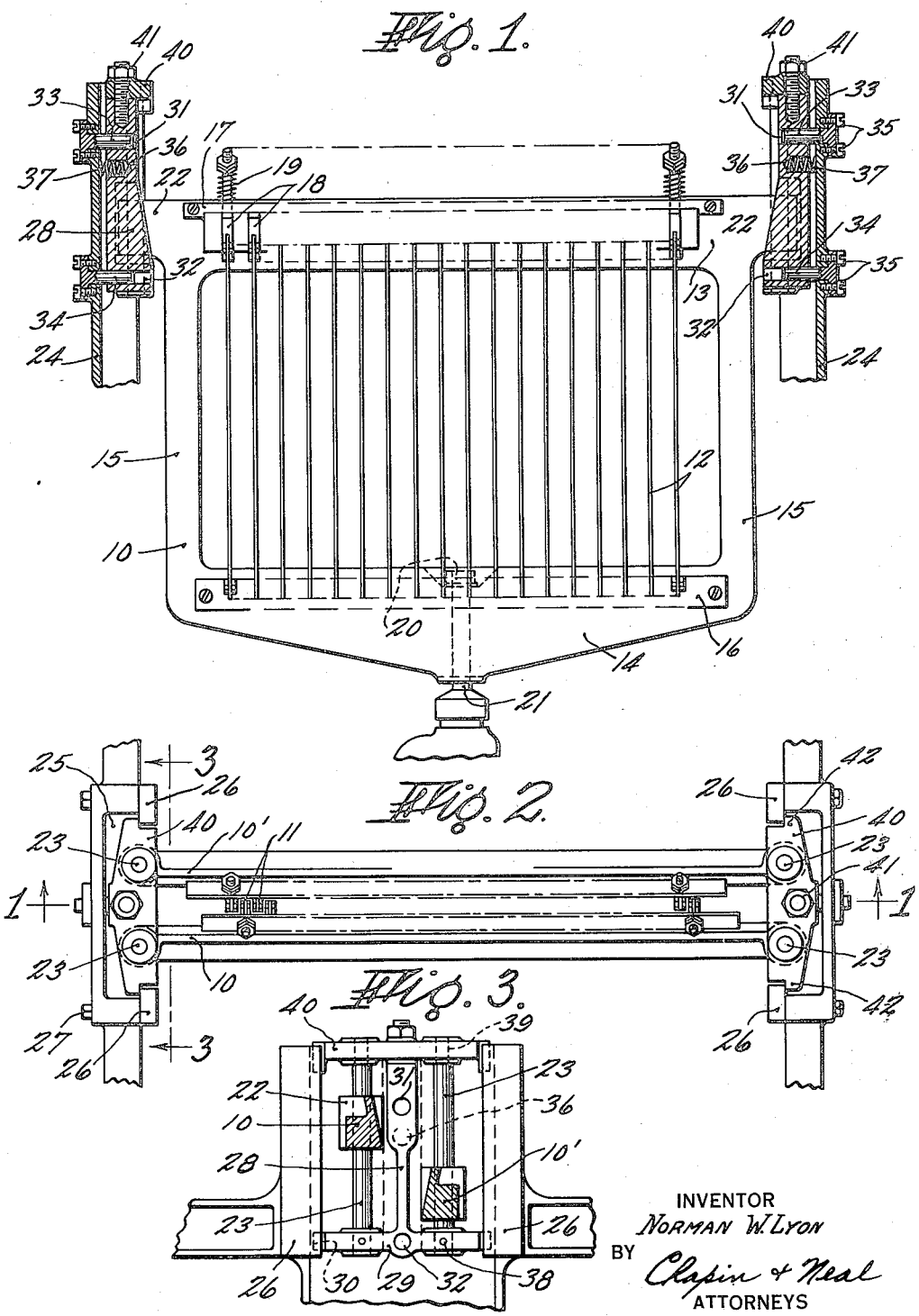

2,101,402

UNITED STATES PATENT OFFICE 2,101,402

GUIDE MOUNTING FOR BREAD SLICING KNIFE FRAMES

Norman W. Lyon, Springfield, Mass., assignor to National Bread Wrapping Machine Co., Springfield, Mass., a corporation of Massachusetts Application April 1, 1936, Serial No. 72,118

4 Claims. (Cl. 146—153)

In the operation of bread slicing machines of the type having reciprocating sets of knives, trouble has hitherto been experienced in the binding of the reciprocating knife frames in their bearings after continued operation. The friction of the knives in the soft bread is very great, and the heat consequently developed in the knives is transmitted to the knife frames with the result that they expand and bind in the bearings in which they reciprocate. It is the object of the present invention to provide an improved bearing structure for the knife frames which will obviate the difficulties heretofore encountered and which will guide the knife frames for free reciprocation irrespective of the amount of heat developed in the slicing operation.

The invention will now be described with reference to the accompanying drawing, in which Fig. 1 is a detail of one of the knife frames of a bread slicing machine, the bearing structure in which the frame reciprocates being shown in section on line 1—1 of Fig. 2;

Fig. 2 is a top plan view of the structure shown in Fig. 1, the two oppositely reciprocating knife frames being shown; and Fig. 3 is a detail on line 3—3 of Fig. 2.

The two knife frames of a standard type of bread slicing machine are shown at 10 and 10'. These frames are identical except for such changes as may be necessary to cause the brackets 11 which hold the knives 12 to interfit as shown in Fig. 2, and a description of one will therefore suffice. Each frame comprises a casting having top and bottom members 13 and 14 respectively and side pieces 15. A knife supporting bar 16 is fixed to the bottom member 14, in which the lower ends of the knives are removably attached in the usual manner. A second knife supporting bar 17 is fixed to the top member 13, in which individual knife supporting members 18 are slidably mounted. Each of these members is under the influence of a compression spring 19 so that each knife is kept under an individual tension. The members 18 are staggered on the two frames, as is indicated on Fig. 2, so that all the knives are disposed with their cutting edges in substantially a single plane in the usual manner.

Each frame is removably secured by a nut 20 to a reciprocating rod 21 which is driven up and down at a high rate of speed by any desired mechanism. For guiding the frame during its reciprocation it is provided with outwardly extending lugs 22 perforated, and preferably bushed, to receive a guide rod 23 mounted as will be described. The side frames of the machine, which may be of any desired type, are indicated at 24 in the drawing. Each of these frames is formed with a box-like structure or recess 25 having removable gibs 26 held in place by bolts 27, and containing a guide rod supporting frame or sub-frame formed with a central vertical rib 28 and with a lower cross rib 29 having ears 30 adapted to engage behind the gibs 26. The central rib 28 is provided with holes 31 and 32 to receive dowels 33 and 34 held removably in the side frame by cap screws 35. A blind hole 36 in the middle of the central rib receives a compression spring 37 which serves to give to the supporting frame a constant tendency to move against the gibs 26. The rods 23 previously referred to are connected to the cross rib 29 by pins 38. At their upper ends these rods are reduced in diameter so as to fit into holes 39 in a cap piece 40 held in position on the central rib 28 by a bolt 41 and having ears 42 similar to the ears 30 and serving to contact the rear of the gibs 26.

When the device is assembled the assembly consisting of the central rib 28, the lower cross rib 29, the rods 23, and the cap piece 40, forms a floating guide movable outwardly or inwardly on the dowels 33 and 34. The assembly is limited in its movement away from the side frame by the gibs 26, and is limited in its inward movement by the spring 37. The springs 37 on the two opposed units tend to equalize each other and thus to hold the knife frame in a central position. If the knife frame expands due to the heat of cutting, the guide units are perfectly free to move sideways while still retaining this equalized position. If it is desired to remove the knife frame this can be done by disconnecting the nut 20 which holds it to the reciprocating mechanism and the bolts 41 which hold the cap pieces 40. When the latter pieces are removed the guide rods will be retained by the pins 38, and the knife frames can easily be slipped off. If it is desired to remove the guide assemblies as well these can be taken off after the knife frames have been removed, or they can be taken off without removing the cap pieces by taking out the dowels 33 and 34 from the outside of the frames.

I claim:

1. In a bread slicing machine, having a reciprocable knife frame and fixed supporting frames disposed one adjacent each of two opposite sides of the knife frame, sub-frames mounted one in each of the fixed supporting frames and having means for guiding said knife frame in its reciprocating movement, interengageable means provided on each fixed frame and its adjacent sub-frame for slidably supporting the sub-frames on the fixed frames for limited movement toward and away from each other in a plane normal to that of the movement of the knife frame, and yieldable means for moving the sub-frames toward each other.

2. In a bread slicing machine, having a reciprocable knife frame and fixed supporting frames disposed one adjacent each of two opposite sides of the knife frame, sub-frames mounted one in each of the fixed-supporting frames and having means for guiding said knife frame in its reciprocating movement, interengageable means provided on each fixed frame and its adjacent sub-frame for slidably supporting the sub-frames on the fixed frames for limited movement toward and away from each other in a plane normal to that of the movement of the knife frame, yieldable means for moving the sub-frames toward each other, and means for limiting the movement of said sub-frames by said yieldable means.

3. In a bread slicing machine, having a pair of knife frames reciprocable in spaced parallel planes and a pair of fixed side frames disposed one adjacent each of two opposite sides of each knife frame, a pair of guide rods for each knife frame disposed one adjacent each of said sides and on which said knife frames are slidably mounted for movement in said planes, a pair of sub-frames each carrying one guide rod of each pair, interengageable means provided on each fixed frame and a sub-frame for slidably supporting the sub-frames for a limited movement toward and away from each other in a plane normal to that of the movement of the knife frame, yieldable means acting on each sub-frame in balanced relation with respect to its guide rods for moving said sub-frames toward each other, and means for limiting the movement of said sub-frames by said yieldable means.

4. In a bread slicing machine, a pair of knife frames reciprocable in spaced parallel planes, a pair of fixed side frames disposed one adjacent each of two opposite sides of each knife frame, said side frames having recesses in their confronting faces and said knife frames each having a pair of lugs extending in opposite directions from said sides and one into each said recess, sub-frames mounted one in each recess for limited sliding movement toward and away from one another in a plane normal to said frames, each sub-frame carrying two spaced guide rods with which the lugs on the adjacent side of the knife frames are slidably engaged one with each, each sub-frame having cross members one on each side of said lugs in which the ends of the guide rods are fixed and a member interconnecting the cross members, means on each side frame engageable with the ends of both cross members of its sub-frame for limiting the movement of the sub-frame in a direction outwardly of the recess in which it is mounted, and yieldable means for moving each sub-frame in said outward direction, whereby on expansion of said knife frames said last named means will yield and allow the sub-frames to move further into said recesses.

NORMAN W. LYON.